United States Patent [19]

Takeshita

[11] 4,051,369
[45] Sept. 27, 1977

[54] METHOD FOR INSPECTING NUCLEAR FUEL ROD OR IRRADIATION CAPSULE

[75] Inventor: Isao Takeshita, Oarai, Japan

[73] Assignee: Japan Atomic Energy Research Institute, Tokyo, Japan

[21] Appl. No.: 547,743

[22] Filed: Feb. 6, 1975

[30] Foreign Application Priority Data

Feb. 9, 1974  Japan .................................. 49-16686

[51] Int. Cl.² ........................................... G03B 41/16
[52] U.S. Cl. .................................................. 250/321
[58] Field of Search ...................... 250/321, 323, 303

[56] References Cited

U.S. PATENT DOCUMENTS

| | | | |
|---|---|---|---|
| 3,493,746 | 2/1970 | Webb | 250/321 |
| 3,678,273 | 7/1972 | Lewis | 250/303 |
| 3,883,738 | 5/1975 | Glover et al. | 250/303 |
| 3,916,189 | 10/1975 | Katsuta | 250/303 |

*Primary Examiner*—Alfred E. Smith
*Assistant Examiner*—B. C. Anderson
*Attorney, Agent, or Firm*—Wenderoth, Lind & Ponack

[57] ABSTRACT

A method for inspecting a nuclear fuel rod or irradiation capsule in which a heat transfer medium consisting of a liquid metal having a radioactive element uniformly admixed therewith is charged, e.g. poured, into a gap defined between the nuclear fuel material and the sleeve enclosing the fuel material in the nuclear fuel rod or into gaps defined between the nuclear fuel material and the innermost tube and between the adjacent tubes in an irradiation capsule comprising a plurality of concentric tubes enclosing the nuclear fuel material in multiple layers. A film sensitive to the radioactive element is wound about the sleeve of the nuclear fuel rod or about the outermost tube of the capsule, and the conditions of the film after the film has been exposed to the radioactive element are detected.

A heat transfer medium for use in the method which may be sodium or NaK having ²⁴Na admixed uniformly therewith.

6 Claims, 3 Drawing Figures

METHOD FOR INSPECTING NUCLEAR FUEL ROD OR IRRADIATION CAPSULE

BACKGROUND OF THE INVENTION

This invention relates to a method for inspecting a nuclear fuel rod or irradiation capsule.

Uranium carbide, uranium nitride, plutonium carbide or plutonium nitride or mixture compounds thereof are desirable nuclear fuels having high power densities (especially, for use in fat neutron reactors) because these materials have high melting points and high thermal conductivities. Various attempts have been made to effectively transfer energy radiated from any one of these nuclear fuel materials of high power densities to a coolant. In one of the prior art attempts, a heat transfer medium having a high thermal conductivity such as sodium or NaK is charged into a gap defined between the nuclear fuel material and a sleeve enclosing the fuel material to provide a thermal conductivity higher than that obtainable when gas (such as helium) is charged as the heat transfer medium in the gap, to thereby further increase the power density of the whole core of the reactor.

This technology can be also equally applied to an irradiation capsule which is employed in an irradiation test of an experimental nuclear fuel rod for experiment in a laboratory. The irradiation capsule generally comprises a plurality of concentric and spaced tubes with the innermost tube directly enclosing the nuclear fuel rod and the succeeding outer tubes surrounding their adjacent inner tubes in succession and a heat transfer medium such as Na or He charged into gaps defined between the fuel rod and innermost tube and between the adjacent tubes. The thus prepared irradiation capsule is inserted into the hole in the reactor core element to measure the temperature of the fuel rod and to determine the power density of the rod. Even in such an irradiation capsule, when a liquid metal such as Na or NaK is used as the heat transfer medium to be charged into the respective gaps in place of the conventional gas (helium), the power from the nuclear fuel material can be more precisely determined and the maximum service life of the fuel rod can be also more precisely determined than when the gas heat transfer medium is employed. However, sodium has a melting point of 97.8 °C and is in a solid phase at normal temperature. Furthermore, since sodium is an easily oxidized material, when the sodium heat transfer medium is charged into the nuclear fuel rod, it is necessary that the fuel rod and sodium be maintained at a temperature above the melting point of the sodium while the sodium is being charged into the rod. In addition, the charging amount of the sodium should be controlled to a suitable level within the fuel rod. In addition, since the gap defined between the fuel material and sleeve enclosing the material is very narrow, on the order of 0.1 –0.5 mm, when the heat transfer medium is charged into the gap, a void or voids will be easily formed in the sodium heat transfer medium charged into the gap. The formation of a void or voids is undesirable because the void or voids may increase the temperature of the nuclear fuel material to an undesirably high degree (a hot spot or spots are formed in the nuclear fuel rod). Determination of the presence of a void or voids in the heat transfer medium is very important from the standpoint of safety such as the prevention of destruction of the fuel rod and pollution of the primary cooling system during the operation of a nuclear reactor in case of a fuel rod and in case of an irradiation capsule, for assuring safety during an irradiation operation and fulfillment of research purposes through the prevention of damage of the experimental nuclear fuel rod and capsule vessel and of pollution of the primary cooling systen in an experimental nuclear reactor. Thus, it is necessary to inspect the amount (level) of the heat transfer medium charged into the nuclear fuel rod and the presence of a void or voids in the heat transfer medium and if any, the size of the void or voids.

For the inspection of the presence of a void or voids in the above-mentioned sodium-type heat transfer medium, a decisive and satisfactory inspection technology has not yet been found because research and development on the nuclear fuel rods having the sodium-type heat transfer medium themselves are still under way. The X-ray radiography or gamma radiography from an external ray source can scarcely identify a void or voids through the density of a film, since sodium has a relatively low density, the gap is narrow and the object to be inspected is surrounded by a high density material. Flaw detecting inspection by the untrasonic waves is also difficult for the same reason. Thus, under the present state of the art, the quality inspection of nuclear fuel rods has been effected by removing the sleeve from the nuclear fuel material after the sodium-type heat transfer medium has been charged into the nuclear fuel material in a charging procedure considered as effective to prevent a void or voids from forming in the heat transfer medium and observing the presence of a void or voids in the heat transfer medium with the naked eye and if any, the size of such a void or voids and on the assumption based on the data obtained from the naked-eye observation that the same fuel rod production method will provide the same charging level. However, this inspection method is not accurate and is very troublesome.

SUMMARY OF THE INVENTION

Therefore, the principal object of the present invention is to provide a novel and improved method for inspecting a nuclear fuel rod which can effectively eliminate the above-mentioned disadvantages inherent in the conventional methods for inspecting nuclear fuel rods referred to above.

Another object of the present invention is to provide a novel and improved method for inspecting an irradiation capsule which can effectively eliminate the disadvantages inherent in the conventional methods referred to above.

Another object of the present invention is to provide a method for inspecting a nuclear fuel rod whereby the charging level of the heat transfer medium in the rod and the presence of a void or voids in the charged heat transfer medium can be simply and precisely detected.

Another object of the present invention is to provide a method for inspecting an irradiation capsule whereby the charging level of the heat transfer medium in the nuclear fuel rod and the presence of a void or voids in the charged heat transfer medium can be simply and precisely determined.

Another object of the present invention is to provide a heat transfer medium to be suitably employed in the above-mentioned method for inspecting a nuclear fuel rod.

Another object of the present invention is to provide a heat transfer medium to be suitably employed in the above-mentioned method for inspecting an irradiation capsule.

According to the present invention, there has been provided a method for inspecting a nuclear fuel rod or irradiation capsule comprising the steps or charging a heat transfer medium including a liquid metal uniformly admixed with a radioactive element into the gap defined between a nuclear fuel material and a sleeve enclosing the fuel material in a nuclear fuel rod or into gaps defined between a nuclear fuel material and the innermost tube and between the adjacent tubes in an irradiation capsule which comprises a plurality of concentric and spaced tubes enclosing the fuel material in multiple layers, winding a film which is sensitive to the radioactive elements about said sleeve of the fuel rod or the outermost tube of the capsule, and detecting the conditions of the film after the film has been exposed to the radioactive element.

According to the present invention, there has been further provided a heat transfer medium for use in the method which comprises sodium or NaK and $^{24}$Na uniformly admixed with sodium or NaK.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

PREFERRED EMBODIMENT OF THE INVENTION

Figure 1:
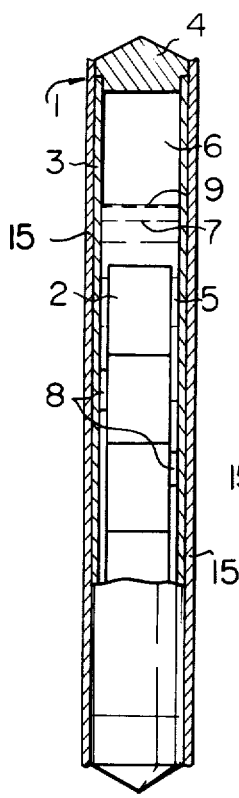
FIG. 1 is an elevational view of a nuclear reactor fuel rod which is the object to be inspected by the method of the present invention and which utilizes a heat transfer medium constructed in accordance with the present invention, a portion of the rod being cut away to show the inner construction thereof.

The present invention will now be described referring to the accompanying drawings which shows one preferred embodiment of the present invention and more particularly, to FIG. 1 in which a nuclear reactor fuel rod 1 which is the object to be inspected by the method of the present invention is shown. The fuel rod 1 comprises fuel material 2 consisting of a plurality of nuclear fuel pellets disposed in end-to-end relationship and a sleeve 3 enclosing the fuel material 2 in a peripherally spaced relationship. The sleeve 3 has a length greater than the full length of the fuel material 2 and the opposite open ends of the sleeve are closed by end plugs 4 (only one open end and its associated end plug are shown in FIG. 1).

In inner diameter of the sleeve 3 is slightly greater than the outer diameter of the fuel material 2 so as to define a small annular gap 5 between the fuel material and sleeve, and a gas plenum 6 is also defined between each end of the sleeve, the adjacent end of the fuel material and the associated end plug. A heat transfer medium 7 which is the subject of the present invention is filled or supplied into the annular gap 5 and a portion of each of the plenums 6. The heat transfer medium 7 has been prepared by uniformly mixing a radioactive element such as $^{24}$Na, for example, with a liquid metal such as sodium or Nak, for example. The heat transfer medium 7 can be also prepared by fully and uniformly agitating $^{24}$Na-containing sodium and sodium as the principal heat transfer medium material together in an agitation vessel at an elevated temperature or by adjusting sodium which has been subject to uniform in-pile irradiation for a brief period of time.

In order to fill or charge the fuel rod 1 with the heat transfer medium 7, molten $^{24}$Na-containing sodium is first poured into the sleeve 3, with one end plug 4 removed from the associated end, to a predetermined amount in an inert gas atmosphere maintained in a high temperature vessel, and thereafter a predetermined amount of the fuel pellets are inserted into the sleeve 3. Alternatively, it is within the scope of the present invention to first insert the fuel pellets into the sleeve 3 and thereafter, pour the molten $^{24}$Na-containing sodium into the sleeve 3. Thereafter, while the molten $^{24}$Na-containing sodium is maintained its molten state, vibration or the like mechanical shock is imparted the fuel rod 1 so that all or most of the void or voids which might otherwise form at the time of pouring of the heat transfer medium into the sleeve will be moved toward the regions of the plenums 6. After all the necessary fuel elements have been placed in the sleeve, inert gas is pumped into the plenums 6 and then, the removed end plug 4 is replaced in the associated open end of the sleeve 3 to seal the sleeve.

Figure 2:
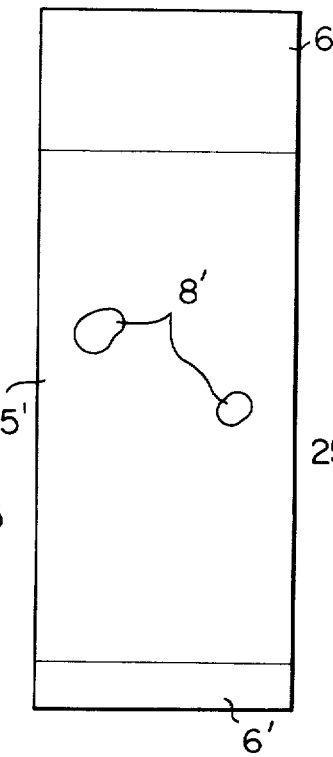
FIG. 2 is a developed view of a photograph film showing the fuel rod of FIG. 1.

A gamma ray sensitive film 15 is then tightly wound about the thus prepared fuel rod 1 and the fuel rod having the film applied thereabout is left as it is for a predetermined period of time so that the film can be exposed to the gamma rays (1.368 MeV, 2.754 MeV) from the $^{24}$Na contained in the sodium of the heat transfer medium 7. Thereafter, the film is removed from the fuel rod 1 and developed. When developed, as more clearly shown in FIG. 2 which is a developed view of the developed film 15', in the film, since areas 8' which correspond to the voids 8 in the heat transfer medium and areas 6' which correspond to the gas plenums 6, respectively, show no sensitivity to the gamma rays, the charging or fill level 9 of the heat transfer medium 7 in the fuel rod 1 and presence of a void or voids and if any, the positions, number, shapes and sizes of such voids can be determined by checking the positions and sizes of the non-sensitive areas.

Figure 3:
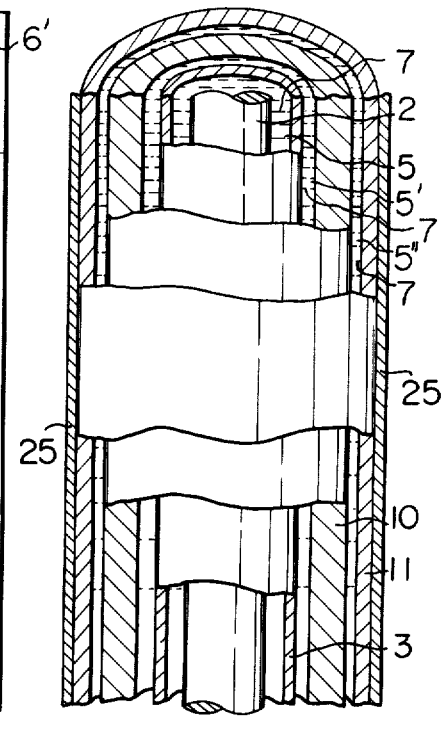
FIG. 3 is an elevational view on an enlarged scale of an irradiation capsule which is the object to be inspected by the method of the present invention.

Referring now to FIG. 3, there is shown an irradiation capsule which is the object to be inspected by the method of the present invention. The capsule comprises three concentric and spaced tubes 3, 10 and 11 defining gaps therebetween. The nuclear fuel material 2 identical with that described in connection with FIG. 1 is enclosed by the innermost tube 3 identical with the sleeve described in connection with FIG. 1 in a peripherally spaced relationship. The innermost tube 3 is in turn enclosed by the heat transfer intermediate tube 10 in a peripherally spaced relationship. The intermediate tube 10 is in turn enclosed by the outermost tube 11 in a peripherally spaced relationship and a gamma ray sensitive film 25 is tightly wound about the outermost tube 11. The heat transfer medium 7 identical with that described in connection with FIG. 1 is charged or poured in the gaps 5, 5' and 5" defined between the fuel material 2 and innermost tube 3, between the innermost and intermediate tubes 3, 10 and between the intermediate and outermost tubes 10, 11, respectively. In the illustrated irradiation capsule, since a plurality of gaps are formed, a void or voids in the heat transfer medium in each gap can be detected based on the density of the film.

In this way, the charging or fill level of the heat transfer medium and void conditions in the fuel rod 1 are detected and when the detection shows that the heat transfer medium charging level and void conditions exceed acceptable ranges set previously, the fuel rod is again placed in the high pressure vessel to relocate the void or voids or the charging amount of the fuel pellets or heat transfer medium in the fuel rod is adjusted.

As appreciated from the foregoing description of one preferred embodiment of the invention, according to the present invention, voids and the charging or fill level of the heat transfer medium in the fuel rod can be simply detected from the exterior of the sleeve or the tubes without removing the sleeve or the tubes from the fuel material as necessary hithertofore and thus, the fuel rod and/or irradiation capsule can be simply and precisely inspected to thereby contribute to improvement of the quality of nuclear fuel rods and/or capsules.

Also, by using $^{24}$Na as a tracer, no chemical reactions between the $^{24}$Na and Na or NaK, the hu 24Na and fuel material occur.

In the foregoing description has been made of one preferred embodiment of the invention, but it will readily occur to those skilled in the art that the same as illustrative in nature, but does not limit the scope of the invention in any way. The scope of the invention is limited only by the appended claims.

I claim:

1. A method for inspecting a nuclear fuel rod, said method comprising:
   providing a nuclear fuel material enclosed within a sleeve with a gap therebetween;
   filling said gap with a heat transfer medium including a liquid metal uniformly admixed with a radioactive element;
   winding a film which is sensitive to said radioactive element around said sleeve, and allowing said film to be exposed to said radioactive element through said sleeve; and
   developing said film and detecting the condition of said film, after exposure to said radioactive element, to determine areas of said film not exposed to said radioactive element, as indications of the location of the level of said heat transfer medium within said nuclear fuel rod and of the existence of voids in said heat transfer medium within said gap.

2. A method as claimed in claim 1, wherein said heat transfer medium comprises sodium and $^{24}$Na uniformly admixed with said sodium.

3. A method as claimed in claim 1, wherein said heat transfer medium comprises NaK and $^{24}$Na uniformly admixed with said NaK.

4. A method for inspecting an irradiation capsule, said method comprising:
   providing a nuclear fuel material enclosed within the innermost of a plurality of spaced concentric tubes, there being gaps between said fuel material and said innermost tube and between adjacent of said tubes;
   filling said gaps with a heat transfer medium including a liquid metal uniformly admixed with a radioactive element;
   winding a film which is sensitive to said radioactive element around the outermost of said tubes, and allowing said film to be exposed to said radioactive element through said tubes; and
   developing said film and detecting the condition of said film, after exposure to said radioactive element, to determine areas of said film having variations in density as indications of the location of the level of said heat transfer medium within said irradiation capsule and of the existence of voids in said heat transfer medium within said gaps.

5. A method as claimed in claim 4, wherein said heat transfer medium comprises sodium and $^{24}$Na uniformly admixed with said sodium.

6. A method as claimed in claim 4, wherein said heat transfer medium comprises NaK and $^{24}$Na uniformly admixed with said NaK.

* * * * *